United States Patent [19]

Nagano et al.

[11] Patent Number: 5,621,176

[45] Date of Patent: Apr. 15, 1997

[54] PRESSURE SENSOR WHICH PREVENTS LEAKAGE OF FUEL

[75] Inventors: Susumu Nagano; Tateki Mitani, both of Hyogo, Japan

[73] Assignee: Mitsubishi Denki Kabushiki Kaisha, Tokyo, Japan

[21] Appl. No.: 692,152

[22] Filed: Aug. 5, 1996

Related U.S. Application Data

[63] Continuation of Ser. No. 508,189, Jul. 27, 1995, abandoned.

[30] Foreign Application Priority Data

Mar. 30, 1995  [JP]  Japan ..................... 7-100534

[51] Int. Cl.⁶ ........................................... G01L 7/00
[52] U.S. Cl. ................................. 73/714; 73/700
[58] Field of Search ............................ 73/714, 700, 716, 73/721, 751, 706, 45, 40; 137/45, 513.5, 543

[56] References Cited

U.S. PATENT DOCUMENTS

| | | | |
|---|---|---|---|
| 3,995,710 | 12/1976 | Courtot | 137/45 |
| 4,041,967 | 8/1977 | Tsukisaka | 137/45 |
| 4,171,712 | 10/1979 | DeForrest | 137/513.5 |
| 4,212,316 | 7/1980 | Basch | 137/543.17 |
| 5,220,837 | 6/1993 | Silverwater | 73/714 |
| 5,375,472 | 12/1994 | Mitani et al. | 73/706 |
| 5,386,730 | 2/1995 | Ikeda et al. | 73/706 |
| 5,419,182 | 5/1995 | Koshimizu et al. | 73/46 |

FOREIGN PATENT DOCUMENTS

| | | | |
|---|---|---|---|
| 4-325316 | 11/1992 | Japan | B60K 15/02 |
| 6-58156 | 8/1994 | Japan | F02M 37/00 |
| 6-28664 | 8/1994 | Japan | G01L 9/04 |

*Primary Examiner*—Richard Chilcot
*Assistant Examiner*—Max H. Noori
*Attorney, Agent, or Firm*—Sughrue, Mion, Zinn, Macpeak & Seas

[57] ABSTRACT

A pressure sensor into which the internal pressure of a fuel tank is introduced through a nipple portion and the atmospheric pressure is introduced through an atmosphere introducing hole, and a pressure difference between the internal pressure and the atmospheric pressure is detected by a diaphragm, comprises a check valve provided in the nipple portion to prevent fuel from leaking out to the atmospheric side. A pressure buffer chamber in the nipple portion of the pressure sensor is provided in which a ball is installed. A bottom face of the pressure buffer chamber is formed to be concave, and a receiving seat for receiving the ball is provided on the bottom face. Therefore, no fuel leaks outside, even when the vehicle comes across an accident and overturns sideways under the condition that the diaphragm used as a sensor element is fractured in the measurement of internal pressure of the fuel tank.

19 Claims, 7 Drawing Sheets

5,621,176

PRESSURE SENSOR WHICH PREVENTS LEAKAGE OF FUEL

This is a Continuation of application Ser. No. 08/508,189 filed Jul. 27, 1995, now abandoned.

BACKGROUND OF THE INVENTION

The present invention relates to a pressure sensor for measuring an internal pressure of the fuel tank, capable of detecting a fluctuation of pressure in the fuel system of an automobile engine.

FIG. 13 is a perspective view showing a conventional fuel tank as described in Unexamined Japanese Patent Publication (Kokai) Hei-4-325316. In the drawing, numeral 1 is a fuel tank, and numeral 1a is a fuel tank body. Numeral 2 is a plate to which a pipe 2a, fuel pump 3, fuel level measuring unit 4 and pressure sensor 5 are assembled. Numeral 6 is a rubber packing. FIG. 14 is an enlarged perspective view showing the plate 2 arranged on the fuel tank body and its periphery. Further, FIG. 15 is a cross-sectional view showing the inside of the pressure sensor 5 disclosed, for example, in Postexamined Japanese Utility Model Publication (Kokoku) Hei-6-28664.

In FIG. 15, numeral 7 is a casing of the pressure sensor 5 composed of a casing body 8 and cover 9. Numeral 10 is an atmosphere introducing hole for introducing the atmospheric pressure, which is a reference pressure, provided on a mount 11 of the casing body 8. Numeral 12 is a filter made of a polytetrafluoroethylene porous film provided in such a manner that the filter 12 covers the atmosphere introducing hole 10. This filter 12 is fixed to the mount 11 through a seal member 13 by means of thermal hardening. Numeral 14 is a nipple. Numeral 15 is a semiconductor sensor element to detect a difference between the atmospheric pressure introduced from the atmosphere introducing hole 10 and the pressure to be measured introduced from the nipple 14, and the detected pressure difference is converted into an electric signal by the semiconductor sensor element. Numeral 15a is a diaphragm displaced in accordance with the pressure difference. A gauge resistance that has spread on the diaphragm is changed in accordance with an amount of the displacement. Numeral 16 is a printed circuit board by which an electric signal outputted from the semiconductor sensor element 15 is amplified and corrected so as to obtain a predetermined output.

The fuel tank internal pressure sensor composed in the above manner is used for measuring an internal pressure of the fuel tank 1 and that of the evaporative emission control device, which is not shown in the drawing, connected to the fuel tank.

In this case, commonly, the internal pressure of the fuel tank is very low. In order to measure the low pressure, the sensitivity with respect to pressure is increased by extending the size of the diaphragm 15a in the sensor element 15 and reducing the thickness of the diaphragm 15a, so that an intensity of the obtained signal is increased.

Since the conventional fuel tank internal pressure measuring device is composed as described above, there is a possibility that a liquid containing water gets into the diaphragm portion and the diaphragm may be broken in the case of freezing or by a shock given in the case of collision of a vehicle. When the diaphragm is broken and the vehicle overturns sideways, fuel leaks out.

SUMMARY OF THE INVENTION

The present invention has been accomplished to solve the above problems. It is an object of the present invention to provide a pressure sensor for measuring the internal pressure of a fuel tank from which no fuel leaks out even when a vehicle overturns sideways under the condition that the diaphragm is broken.

The present invention provides a pressure sensor comprising: a check valve provided in the nipple portion to prevent fuel from leaking out to the atmospheric side.

According to the invention, in the pressure sensor, a pressure buffer chamber is provided in the nipple portion, and a ball is installed in the pressure buffer chamber.

According to the invention, in the pressure sensor, a pressure buffer chamber is provided in the nipple portion, and a spool-shaped check valve is installed in the pressure buffer chamber. Furthermore, the spool-shaped check valve is made of rubber.

According to the invention, a pressure buffer chamber is provided in the nipple portion, and a substantially conical check valve is installed in the pressure buffer chamber.

Further, a pressure measuring port is provided on the fuel tank, and the pressure measuring port and the nipple are connected with each other by a tube. Furthermore, a pressure sensor is attached to the evaporative emission control device.

According to the invention, a check valve is provided in the nipple portion. Accordingly, the fuel in the fuel tank is prevented from flowing out through the nipple and leaking out from the broken portion of the diaphragm, because the check valve automatically stops up the fuel passage being pushed by the pressure of flowing fuel. Therefore, no fuels leaks outside.

Furthermore, in the pressure sensor, the fuel tank and the pressure sensor may be connected with each other by a tube. Therefore, it is possible that the pressure sensor is not arranged directly on the fuel tank but it is arranged at a different position.

Moreover, in the pressure sensor according to the present invention, the check valve is arranged in the nipple portion. Accordingly, the gas sent from the evaporative emission control device is prevented from leaking out from the broken portion of the diaphragm, because the check valve is pushed by the pressure of flowing fuel so that the gas passage is stopped up. Therefore, no gas leaks outside.

DETAILED DESCRIPTION OF PREFERRED EMBODIMENTS

Embodiment 1

With reference to the attached drawings, an embodiment of the present invention will be explained as follows.

Figure 1:
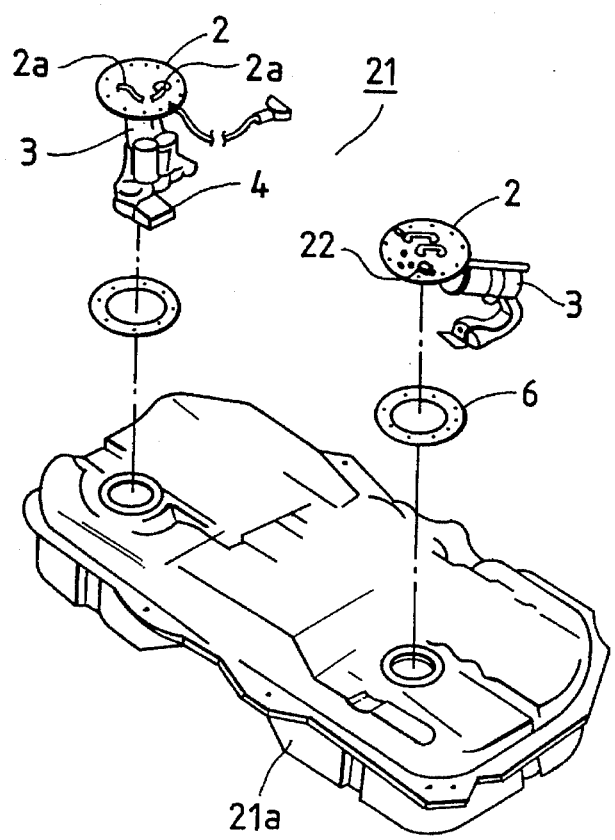
FIG. 1 is a perspective view showing the fuel tank of Embodiment 1 of the present invention.

FIG. 1 is a perspective view showing a fuel tank 21 relating to the present invention. Like parts in this drawing and the drawing of the prior art are identified by the same reference characters. Numeral 21a is a fuel tank body, and numeral 22 is a pressure sensor mounted on the fuel tank body.

Figure 2:
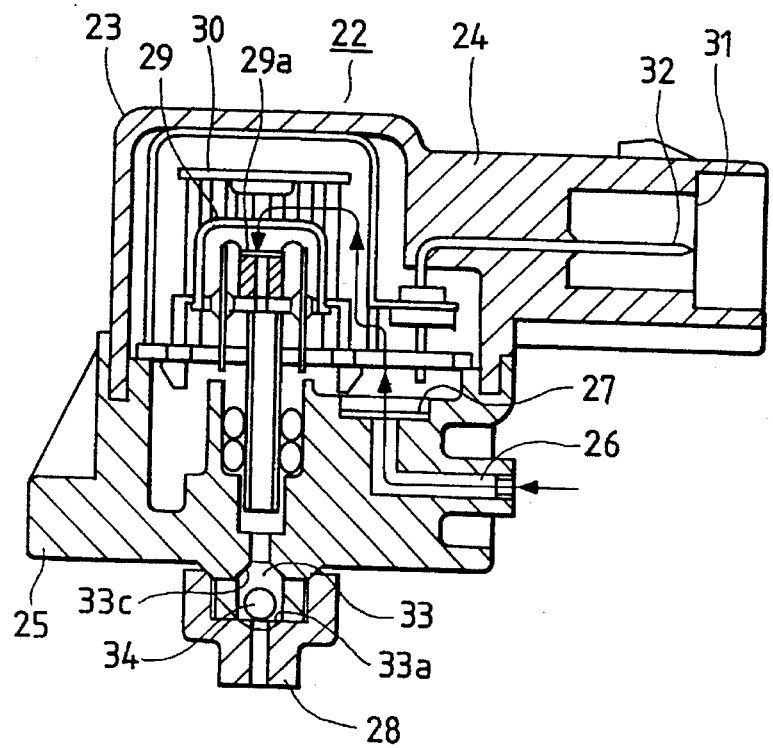
FIG. 2 is a cross-sectional view showing the pressure sensor of Embodiment 1 of the present invention.

FIG. 2 is a cross-sectional view showing the pressure sensor 22. In the drawing, numeral 23 is a pressure sensor casing composed of a casing body 24 and a base 25. Numeral 26 is an atmosphere introducing hole formed on the base 25, wherein the atmospheric pressure is introduced through the atmosphere introducing hole so as to be used as a reference pressure. Numeral 27 is a filter made of a polytetrafluoroethylene porous film arranged by means of thermal fusion in such a manner that the filter covers the atmosphere introducing hole 26. Numeral 28 is a nipple. Numeral 29 is a semiconductor sensor element to detect a difference between the atmospheric pressure introduced from the atmosphere introducing hole 26 and the pressure to be introduced from the nipple 28, wherein the detected pressure difference is converted into an electric signal by the semiconductor sensor element. Numeral 29a is a diaphragm displaced in accordance with the pressure difference. A gauge resistance that has spread on the diaphragm is changed in accordance with an amount of the displacement. In order to measure a very low internal pressure of the tank using this diaphragm 29a, the thickness is commonly determined to be ten and several μm. Numeral 30 is a printed circuit board by which an electric signal outputted from the semiconductor sensor element 29 is amplified and corrected so as to obtain a predetermined output. Numeral 31 is a connector. Numeral 32 is a connection terminal.

Figure 3:
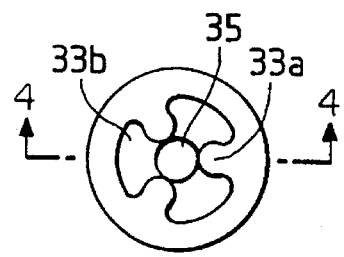
FIG. 3 is a plan view showing the pressure buffer chamber provided in the nipple portion of the pressure sensor of Embodiment 1 of the present invention.
Figure 4:
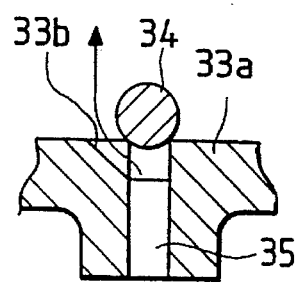
FIG. 4 is a cross-sectional view taken on line A—A in FIG. 3.
Figure 5:
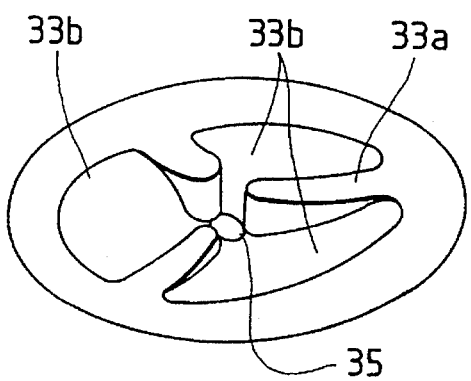
FIG. 5 is a perspective view showing the pressure buffer chamber provided in the nipple portion of the pressure sensor of Embodiment 1 of the present invention.

There is provided a pressure buffer chamber 33 in the nipple 28. There is provided a ball 34 in the chamber. FIG. 3 is a plan view showing the pressure buffer chamber 33. FIG. 4 is a cross-sectional view taken on line A—A in FIG. 3. FIG. 5 is a perspective view. In the drawing, numeral 33a is a receiving seat, numeral 33b is a concave inclined face provided on the bottom surface of the pressure buffer chamber 33, and numeral 35 is a hole formed in the nipple 28.

Next, the operation will be explained below. In a normal pressure measuring operation, the weight of the ball 34 overcomes an impressed pressure. Accordingly, the ball 34 is located on a lower face of the pressure buffer chamber 33 as illustrated in FIG. 4. Since the lower face is formed to be a petal-shaped receiving seat 33a as illustrated in FIG. 3, it is possible to introduce the pressure from the periphery of the receiving seat 33a.

When a running vehicle unexpectedly encounters an accident and overturns sideways under the condition that the diaphragm 29a of the semiconductor sensor element has been fractured, fuel typically leaks outside through the diaphragm 29a.

Figure 6:
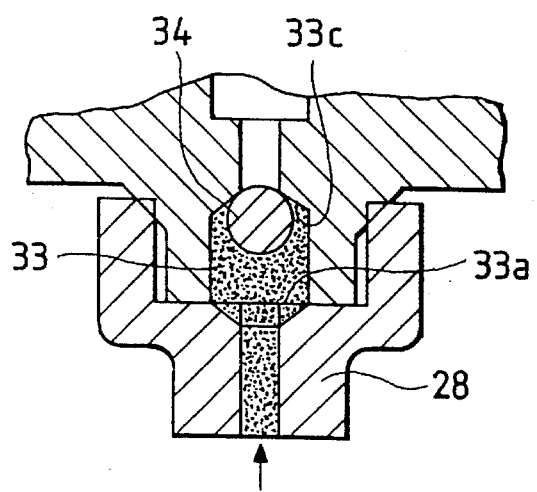
FIG. 6 is a partial cross-sectional view showing the operation of the pressure sensor of Embodiment 1 of the present invention.

When fuel flows out, the ball 34 is pushed out by the pressure of fuel as illustrated in FIG. 6, so that the ball 34 is moved to a face 33c of the pressure buffer chamber 33. When the ball 34 is pushed against the face 33c, the opening is closed by the ball 34. When the opening is closed, fuel leakage does not occur, that is, no fuel leaks outside.

Accordingly, even in the case of an accident in which the vehicle overturns sideways, no fuel leaks out from the pressure sensor. It is possible to provide such a pressure sensor according to the present invention.

Embodiment 2

Figure 7:
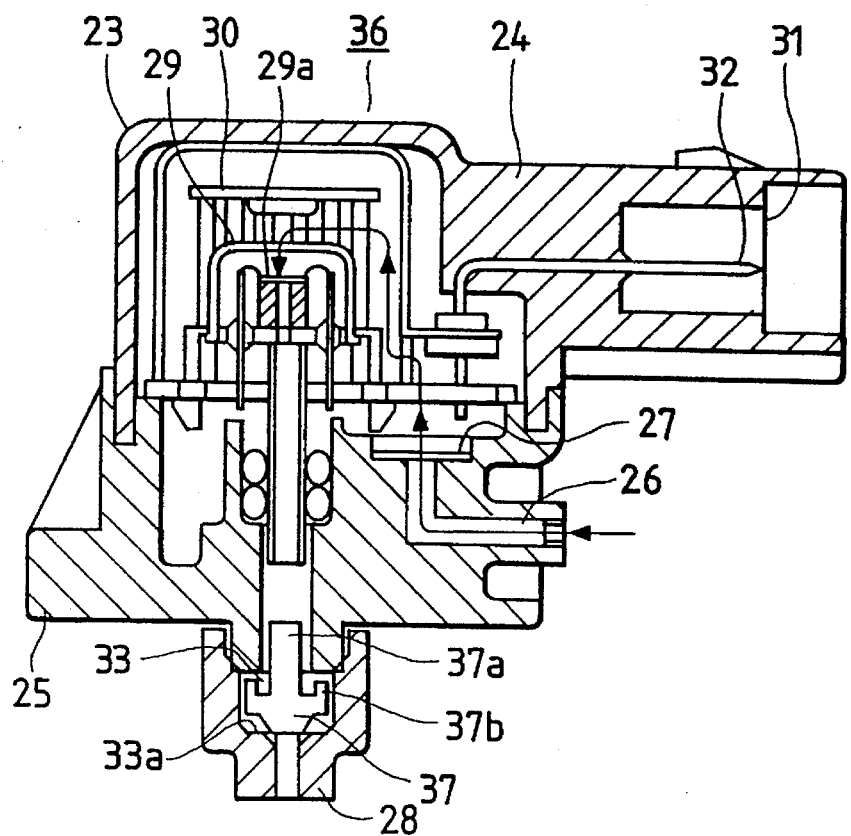
FIG. 7 is a cross-sectional view showing the pressure sensor of Embodiment 2 of the present invention.

In FIG. 7, another embodiment is shown, in which a member composing the check valve in the pressure sensor is different from that of Embodiment 1. The attaching form of the pressure sensor 36 is the same as that of Embodiment 1 as shown in FIG. 1.

In FIG. 7, there is provided a pressure buffer chamber 33 in the nipple 28. In the pressure buffer chamber 33, there is provided a spool-shaped check valve 37 made of rubber.

In a normal pressure measuring operation, the weight of the spool-shaped check valve 37 overcomes the pressure of fuel. Therefore, the spool-shaped check valve 37 is located on a lower face of the pressure buffer chamber 33. Since the receiving seat 33a is formed into the same shape as that of Embodiment 1, it is possible to introduce the pressure of fuel from the periphery of the receiving seat 33a.

When a vehicle unexpectedly encounters an accident and overturns sideways under the condition that the diaphragm 29a of the semiconductor sensor element 29 has been fractured, fuel attempts to leak outside through the diaphragm 29a. However, when fuel flows through the nipple 28, a bottom face of the top-shaped check valve 37 is pushed by the pressure of fuel. Therefore, the top-shaped check valve 37 is guided by the guide 37a and pushed against an upper face of the pressure buffer chamber. That is, under the condition that the vehicle overturns sideways, the top-shaped check valve 37 is pushed against a side face of the pressure buffer chamber.

In this case, a peripheral seal portion 37b of the top-shaped check valve is made of rubber and formed into a semispherical ring-shape. Therefore, the peripheral seal portion 37b provides the same sealing effect as that of an O-ring, so that no fuel leaks outside.

Due to the foregoing, it is possible to provide the same effect as that of Embodiment 1.

Embodiment 3

Figure 8A:
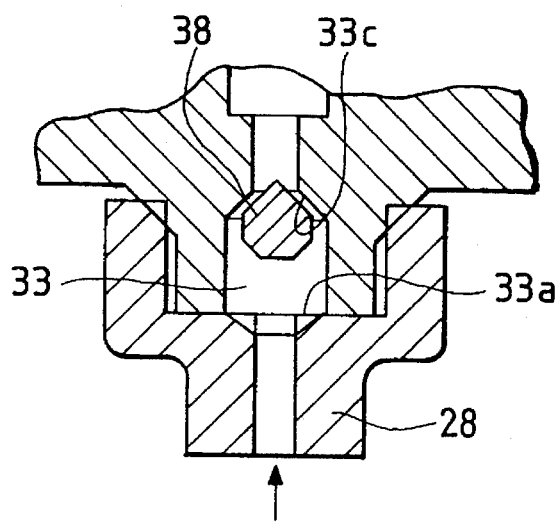
FIG. 8A is a partial cross-sectional view showing the primary portion of the pressure sensor of Embodiment 3 of the present invention.
Figure 8B:
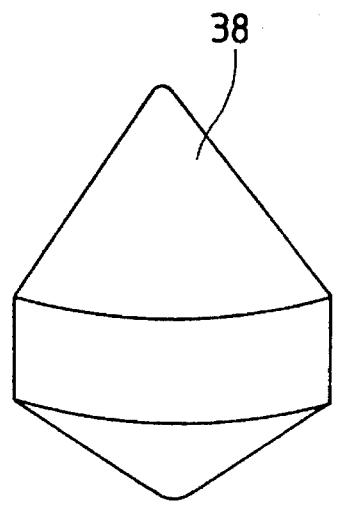
FIG. 8B is a partial perspective view showing the primary portion of the pressure sensor of Embodiment 3 of the present invention.

FIG. 8A is a cross-sectional view of the pressure buffer chamber 33 of the pressure sensor of Embodiment 3. When the check valve 38 is formed to be substantially conical as illustrated in FIG. 8B, the same effect as that of Embodiments 1 and 2 can be provided.

Embodiment 4

Figure 9:
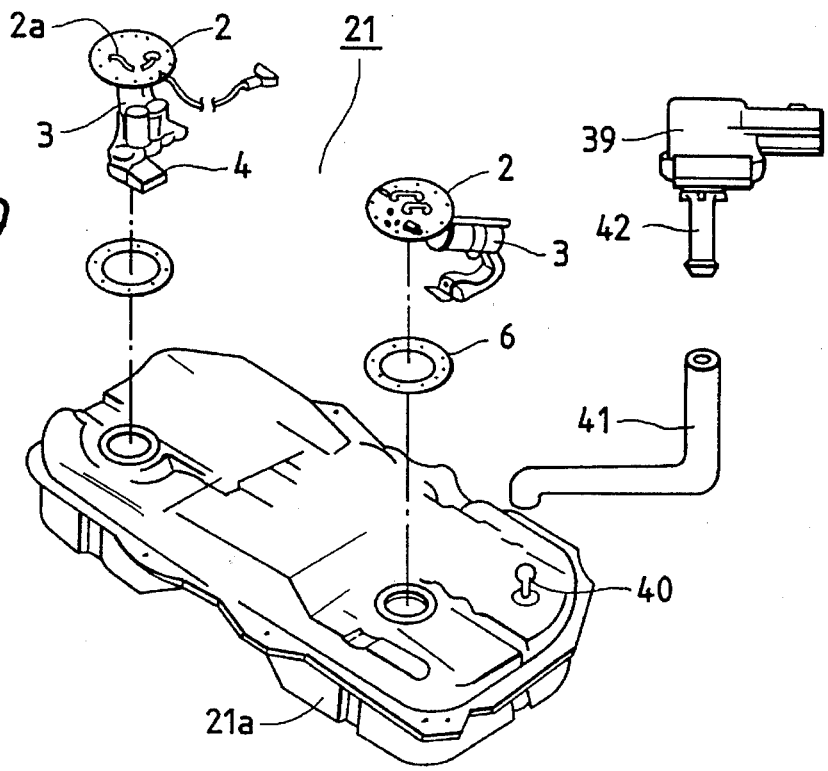
FIG. 9 is a perspective view showing a state in which the pressure sensor of Embodiment 4 of the present invention is attached to the fuel tank.
Figure 10:
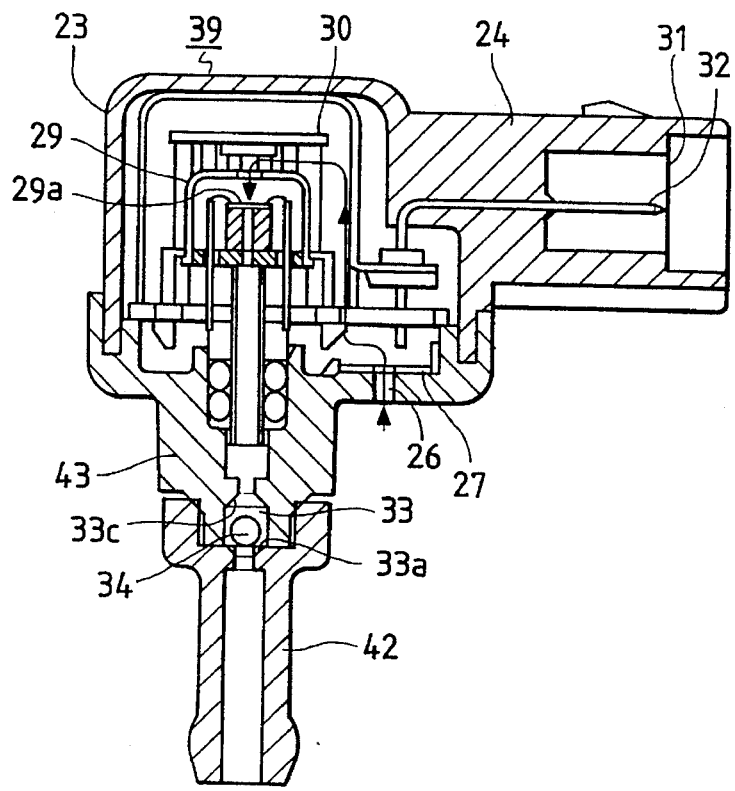
FIG. 10 is a cross-sectional view showing the pressure sensor of Embodiment 4 of the present invention.

FIG. 9 shows an embodiment in which a position of the pressure output port to the pressure sensor 39 is different from that of Embodiment 1. FIG. 10 is a cross-sectional view showing the pressure sensor 39 of Embodiment 4. In the drawing, numeral 40 is a measurement pressure output port arranged on the fuel tank 21, and numeral 41 is a tube for introducing the pressure in the fuel tank into the pressure sensor 39. Therefore, the tube 41 is connected to the nipple 42 of the pressure sensor 39. Numeral 43 is a base. Even in this pressure sensor 39, it is possible to enclose a ball functioning as a check valve. The function of the check valve is the same as that of Embodiment 1.

Due to the foregoing structure, it is possible to attach the pressure sensor 39 without using a plate 2. Therefore, it is possible to arrange the pressure sensor at another position (for example, in the engine room) without arranging it directly on the fuel tank.

Embodiment 5

Figure 11:
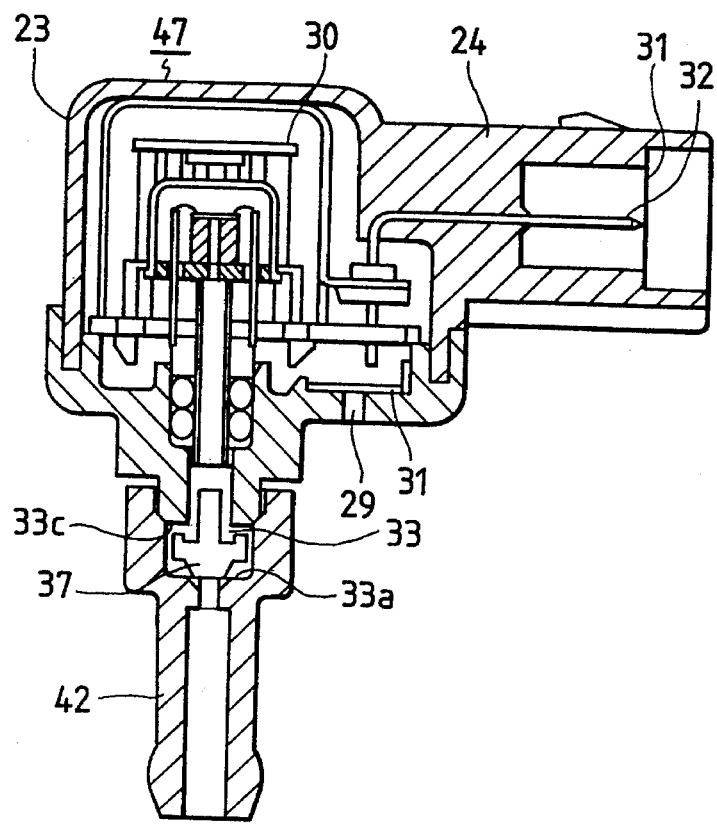
FIG. 11 is a cross-sectional view showing the pressure sensor of Embodiment 5 of the present invention.

FIG. 11 is a cross-sectional view of the pressure sensor 47, the internal structure of which is the same as that of the pressure sensor of Embodiment 2, and the pressure output position of which is the same as that of the pressure sensor of Embodiment 4 illustrated in FIG. 9. Due to the foregoing, it is possible to provide the same effect as that of Embodiment 4.

Even if the check valve is composed in the same manner as that of Embodiment 3, the same effect can be provided.

Embodiment 6

In Embodiments 1 to 5, the pressure output port of the fuel tank is directly connected with the fuel tank. However, the same effect can be provided even when the pressure is introduced from an evaporative emission control device for preventing the evaporative gas in the fuel tank from discharging into the atmosphere.

Figure 12:
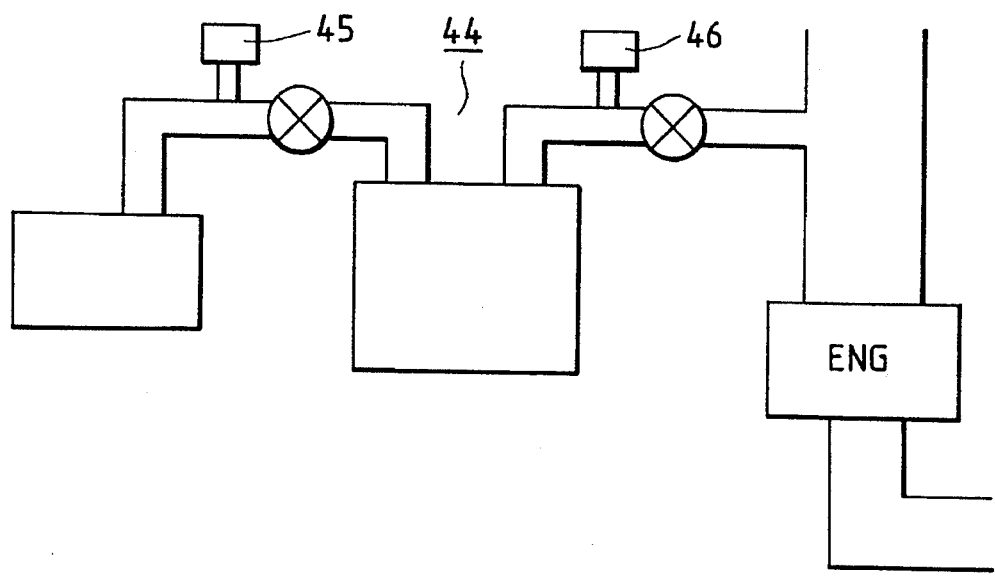
FIG. 12 is a schematic illustration showing Embodiment 6 of the present invention.
Figure 13:
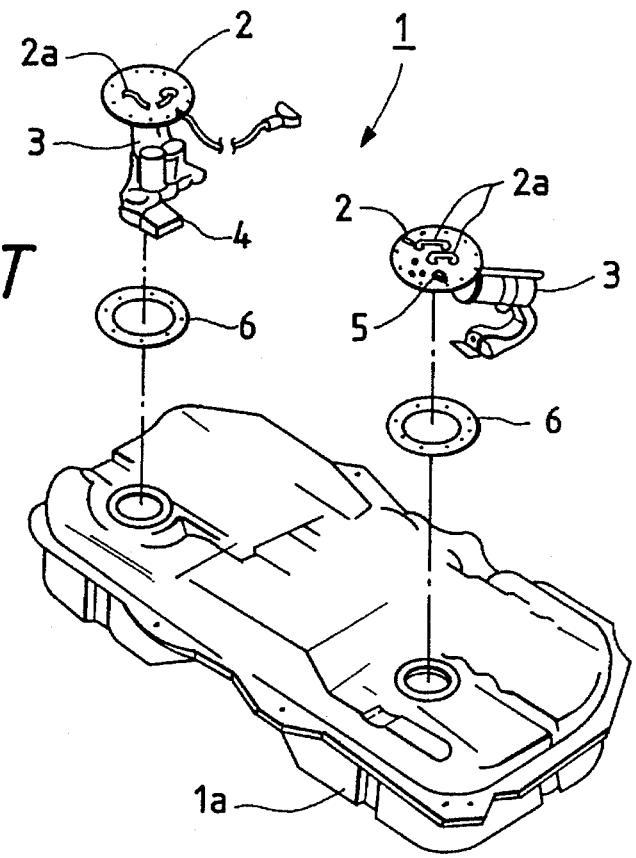
FIG. 13 is a perspective view showing the fuel tank of the prior art.
Figure 15:
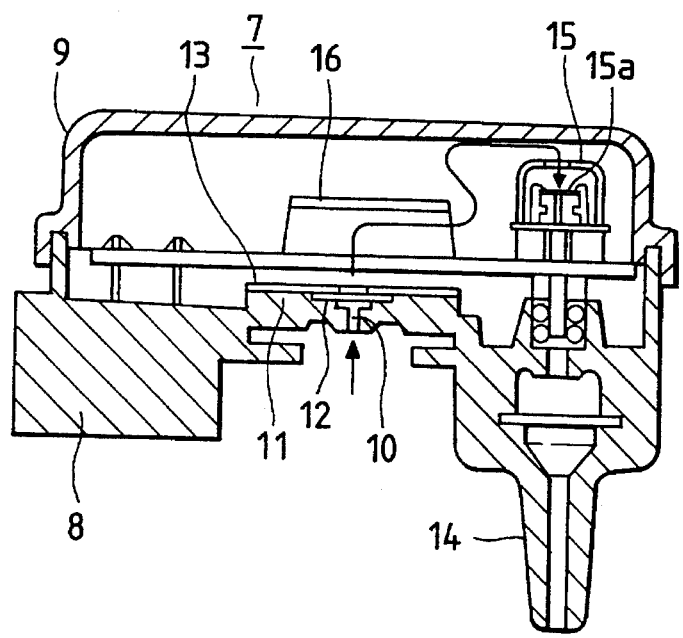
FIG. 15 is a cross-sectional view showing the pressure sensor of the prior art.
Figure 14:
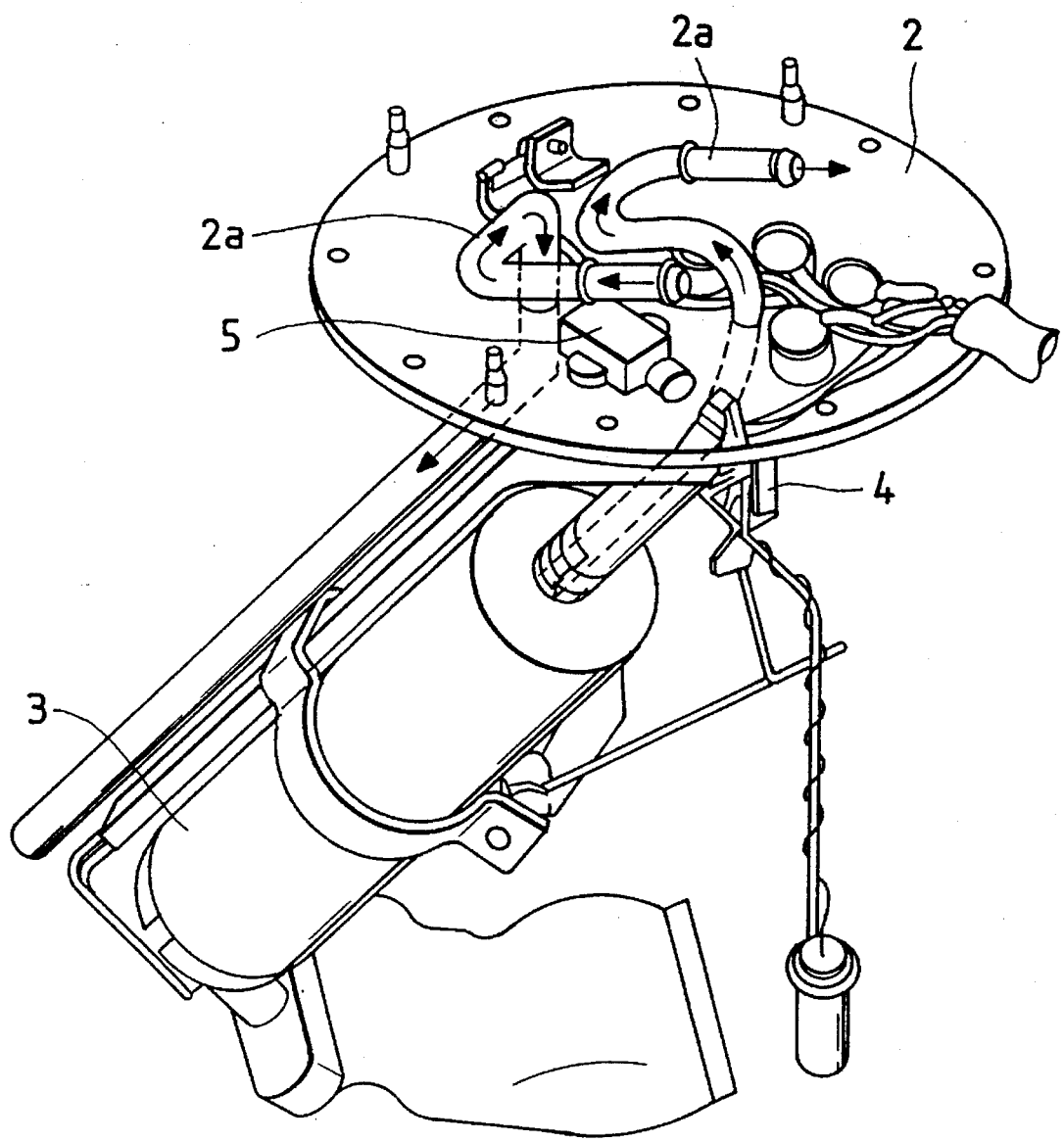
FIG. 14 is an enlarged perspective view showing the detail of the plate portion arranged on the fuel tank of the prior art.

FIG. 12 is a schematic illustration showing a model in which the pressure is introduced from the evaporative emission control device 44. Even when the pressure sensor is arranged at a position represented by numeral 45 or 46, the same effect as that of Embodiment 1 can be provided.

As described above, according to the invention, there is provided a check valve in the pressure introducing chamber. Accordingly, it is possible to provide a safe pressure sensor from which no fuel leaks out even when the vehicle comes across an accident and overturns sideways under the condition that the diaphragm is fractured.

Further, the fuel tank and the pressure sensor may be connected with each other by a tube. Therefore, it is possible to provide an effect in which the pressure sensor is not directly arranged on the fuel tank, but the pressure tank is arranged at another position.

Furthermore, there is provided a check valve in the pressure introducing chamber of the evaporative emission control device. Accordingly, it is possible to provide a safe pressure sensor from which no fuel gas leaks out even when the vehicle comes across an accident and overturns sideways under the condition that the diaphram is fractured.

What is claimed is:

1. A pressure sensor into which the internal pressure of a fuel tank is introduced, comprising:

a nipple portion for introducing a fuel tank pressure;

an air introducing hole for introducing air into an atmospheric pressure portion;

a pressure buffer chamber disposed in said nipple portion; and a check valve provided in the buffer chamber, wherein said check valve is suspended in said buffer chamber in order to allow a fuel to pass through said nipple portion to said atmospheric pressure portion when said fuel tank is upright during a normal operation, wherein said check valve blocks said fuel from passing from said nipple portion to said atmospheric pressure portion when said fuel tank is turned sideways or is turned over, in order to prevent a leakage of said fuel during an overturning of a vehicle carrying said fuel tank.

2. The pressure sensor according to claim 1 further comprising:

a bottom face of the pressure buffer chamber being formed to be concave; and a weighted ball installed in the pressure buffer chamber, wherein a ball receiving seat is provided on the bottom face.

3. The pressure sensor according to claim 1 wherein said check valve further comprises:

a weighted spool-shaped valve member having a guide and a seal portion installed in the pressure buffer chamber, a bottom face of the pressure buffer chamber being formed to be concave;

wherein a check valve receiving seat is provided on the bottom face.

4. The pressure sensor according to claim 3, wherein the check valve is made of rubber.

5. The pressure sensor according to claim 1 wherein said check valve further comprises:

a substantially conical weighted valve member for blocking an upper portion of the pressure buffer chamber, a bottom face of the pressure buffer chamber being formed to be concave;

wherein a check valve receiving seat is provided on the bottom face.

6. The pressure sensor according to claim 1, wherein a pressure measuring port is provided on the fuel tank to which the nipple portion is connected by a tube means.

7. The pressure sensor according to claim 1, wherein a pressure sensor is attached to an evaporative emission control device.

8. A pressure sensor, mountable on a fuel tank, to monitor the internal pressure of the fuel tank, said sensor comprising:

a nipple portion with a feeding hole for introducing the fuel tank pressure;

a pressure buffer chamber disposed to receive the fuel tank pressure introduced through said feeding hole and to pass the fuel tank pressure to a pressure monitoring device through an orifice;

a seating member positioned in said pressure buffer chamber, said seating member comprising a plurality of supports disposed from the walls of said pressure buffer chamber towards the center portion of the chamber, each support tangentially contacting a portion of the periphery of the feeding hole, and each support having a surface raised above the level of said feeding hole to define lower regions abutting said feeding hole between the supports; and a check valve, wherein said check valve rests on said plurality of supports of said seating member and wherein said check valve is raised above said feeding hole, forming a clearance, to allow passage of the introduced fueled tank pressure through the lower regions of said seating member when the fuel tank is in an upright position, and wherein said check valve blocks said orifice in said pressure buffer chamber when the fuel tank is substantially displaced from the upright position.

9. The pressure sensor of claim 8, wherein said check valve has a ball shape.

10. The pressure sensor of claim 8, wherein said check valve has a conical shape.

11. The pressure sensor of claim 8, wherein said pressure buffer chamber includes a channel leading to the orifice, and wherein said check valve has a guiding portion inserted in said channel and a flange portion, said flange portion having a larger diameter than the channel opening to form a peripheral seal around the channel opening when the fuel tank is substantially displaced from the upright position.

12. The pressure sensor according to claim 8, wherein the fuel tank is provided with a measuring port and said nipple portion is connected to the measuring port by a tube means.

13. The pressure sensor according to claim 8, wherein the pressure sensor is attached to the evaporative emission control device.

14. A pressure sensor, mountable on a fuel tank, to monitor the internal pressure of the fuel tank, said sensor comprising:

a nipple portion with a feeding hole for introducing the fuel tank pressure;

a pressure buffer chamber disposed to receive the fuel tank pressure introduced through said feeding hole and to pass the fuel tank pressure to a pressure monitoring device through an orifice;

a seating member positioned in said pressure buffer chamber, said seating member having an annular structure with a plurality of supports protruding from the edge of said annular structure towards the center portion of the annular structure, each support tangentially contacting a portion of the periphery of the feeding hole, and each support having a surface raised above the level of said feeding hole to define lower regions abutting said feeding hole between the supports; and a check valve, wherein said check valve rests on said plurality of supports of said seating member and wherein said check valve is raised above said feeding hole, forming a clearance, to allow passage of the introduced fueled tank pressure through the lower regions of said seating member when the fuel tank is in an upright position, and wherein said check valve blocks said orifice in said pressure buffer chamber when the fuel tank is substantially displaced from the upright position.

15. The pressure sensor of claim 14, wherein said check valve has a ball shape.

16. The pressure sensor of claim 14, wherein said check valve has a conical shape.

17. The pressure sensor of claim 14, wherein said pressure buffer chamber includes a channel leading to the orifice, and wherein said check valve has a guiding portion inserted in said channel and a flange portion, said flange portion having a larger diameter than the channel opening to form a peripheral seal around the channel opening when the fuel tank is substantially displaced from the upright position.

18. The pressure sensor according to claim 14, wherein the fuel tank is provided with a measuring port and said nipple portion is connected to the measuring port by a tube means.

19. The pressure sensor according to claim 14, wherein the pressure sensor is attached to the evaporative emission control device.

* * * * *